G. B. GODDARD.
Mallet.

No. 211,149. Patented Jan. 7, 1879.

Witnesses:
E. A. Hemmenway.
C. H. Dodd.

Inventor:
George B. Goddard
by N. C. Lombard
Attorney.

N. PETERS, PHOTO-LITHOGRAPHER, WASHINGTON, D. C.

UNITED STATES PATENT OFFICE.

GEORGE B. GODDARD, OF BROCKTON, MASSACHUSETTS.

IMPROVEMENT IN MALLETS.

Specification forming part of Letters Patent No. 211,149, dated January 7, 1879; application filed November 8, 1878.

*To all whom it may concern:*

Be it known that I, GEORGE B. GODDARD, of Brockton, in the county of Plymouth and State of Massachusetts, have invented certain new and useful Improvements in Mallets, of which the following, taken in connection with the accompanying drawings, is a specification:

My invention relates to the construction of that class of mallets in which disks or rings of rawhide placed side by side and compressed between metallic collars are used to form the operative surface of the mallet; and it consists in the combination of a metal hub provided with an annular collar, formed in one piece therewith; a series of annular disks or rings of rawhide placed side by side upon said hub; a detachable ring or collar fitted to and encompassing the end of said collar, and adapted to be moved bodily along said hub to compress said rawhide disks; and a pin passing radially through said ring, collar, and the hub to retain said ring thereon.

It further consists in the combination of a central wrought-metal bolt, provided at one end with a detachable collar, and having secured upon its other end, by pouring the molten metal around it, a cast-metal hub provided with a projecting collar formed in one piece therewith; a series of rawhide disks or annular rings placed side by side upon said hub; a detachable collar fitted to and adapted to be moved along said hub to compress said disks or rings; and a pin passing radially through said detachable collar, cast-metal hub, and wrought-metal bolt or handle.

It further consists in the combination, in a mallet, of a cast-metal hub, adapted to receive a series of rawhide disks or annular rings, and provided with suitable means for securing said disks or rings in position thereon; a central wrought-metal bolt attached to said hub by casting the molten metal around it, and projecting therefrom to form the core of the mallet-handle; a series of rings of leather or other suitable compressible and absorbent material placed side by side upon said bolt, compressed firmly together in the direction of the length of said bolt, and secured thereon by means of a detachable collar secured to the outer end of said central bolt, as will be described.

Figure 1:
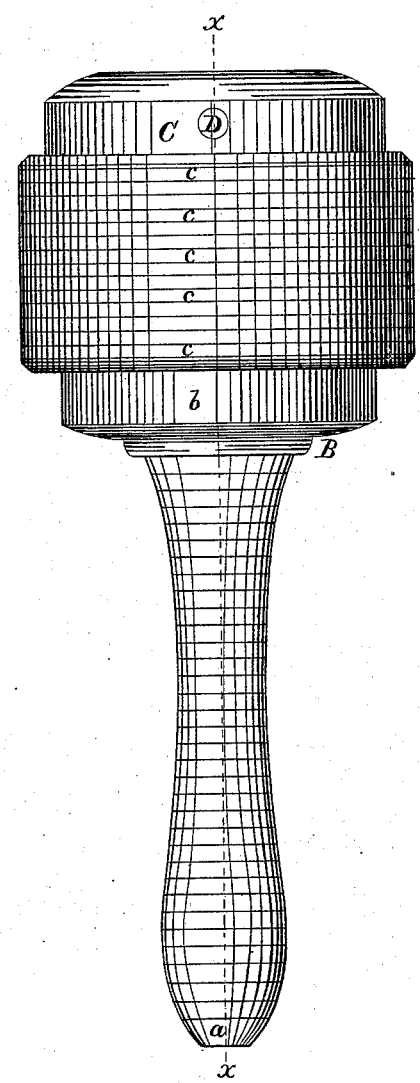
Figure 2:
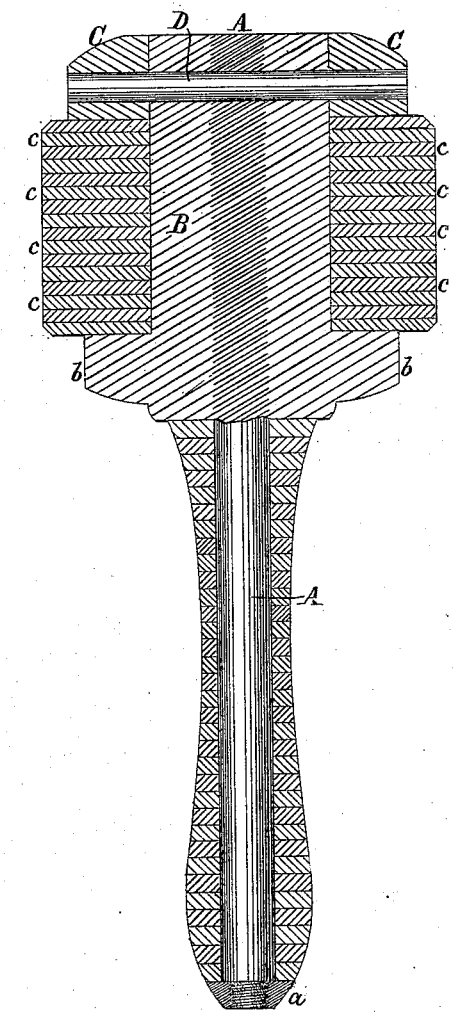

Figure 1 of the drawings is an elevation of a mallet embodying my improvements, and Fig. 2 is a longitudinal section of the same on line $x\ x$ in Fig. 1.

A is a bolt of wrought metal, provided at one end with the removable collar or nut $a$, and having cast upon its other end the hub B, provided at one end with the collar $b$, cast in one piece therewith, said bolt and hub being firmly united by placing the bolt in the mold, and pouring the molten metal around it to form the hub B and collar $b$. The periphery of the hub B is turned off true and smooth, to form a straight cylindrical surface, and a series of annular disks or rings of rawhide, $c$, are fitted thereon side by side, and compressed together to form a solid mass, said rings being held together in such compressed condition by the metal ring or collar C, fitted tightly to said smooth hub B, and secured in position thereon by the pin D, passing radially through the ring C, hub B, and bolt A, as clearly shown in Fig. 2.

The handle of the mallet is formed by fitting to the bolt A a series of rings of leather or other equivalent material, and compressing them between the hub B and collar $a$, and then turning the exterior surface to shape, as described in Letters Patent No. 202,165, granted to me April 9, 1878.

By this construction the cost of manufacturing a serviceable mallet embodying all the best features of the best mallets in use is very much reduced, and when the rawhide which forms the operating-surface of the mallet becomes badly worn, it may be readily and easily replaced by backing out the pin D, removing the ring C and the rawhide disks $c$, placing new rawhide rings on the hub B, replacing the ring C, applying pressure thereto to compress the rawhide, and inserting the pin D.

I do not claim, broadly, a mallet having its operating-surface composed of disks or rings of rawhide, as I am aware that such disks or rings have been used before. Neither do I claim, broadly, a mallet-handle having its exterior surface composed of disks or rings of leather, or equivalent material, compressed together upon a metallic core or central bolt, as such a device is described in the Letters Patent granted to me April 9, 1878, before cited; but

What I claim as new, and desire to secure by Letters Patent of the United States, is—

1. The combination, in a mallet-head, of the hub B, provided with the collar $b$, formed in one piece therewith, a series of disks or annular rings of rawhide, the removable collar or ring C, fitted to and adapted to be moved longitudinally upon said hub to compress said rawhide disks without rotation, and the pin D, passing radially through the ring C and hub B, substantially as and for the purposes described.

2. The combination of the wrought-metal central bolt, A, provided with the removable collar $a$ at one end, the cast-metal hub B and collar $b$, formed in one piece, and secured to the bolt A by casting the metal around said bolt, the series of rawhide disks or rings $c$, the clamping-ring C, and the pin D, all arranged and adapted to operate substantially as and for the purposes described.

3. In combination with a cast-metal hub provided with a fixed collar, and adapted to receive and support a series of rawhide disks or rings, and suitable devices for clamping and holding said rawhide disks in position, a wrought-metal central bolt or rod secured in said hub at one end by pouring the molten metal to form said hub around said bolt, and provided at its other end with a removable collar or nut, $a$, and a series of disks or rings of leather or other non-metallic and absorbent material compressed upon said central bolt between the hub B and collar $a$, substantially as described.

Executed at Brockton, Massachusetts, this 29th day of October, A. D. 1878.

GEORGE B. GODDARD.

Witnesses:
CHARLES W. SUMNER,
URIAH MACOY.